Patented Aug. 14, 1945

2,381,887

UNITED STATES PATENT OFFICE 2,381,887

MIXED ESTERS

John C. Sauer, Wilmington, Del., assignor to E. I. du Pont de Nemours & Company, Wilmington, Del., a corporation of Delaware No Drawing. Application April 30, 1942,
Serial No. 441,224

5 Claims. (Cl. 260—410.8)

This invention relates to new synthetic drying oils and to coating compositions containing them.

The higher grade natural drying oils, such as China wood, perilla, and oiticica oils, are for the most part imported and are subject to wide fluctuation in price, quality, and availability. Some of these oils also have a tendency to form films which "crystallize" or "frost." Previous attempts to provide synthetic substitutes having the desirable film-forming characteristics of these natural oils have been for the most part unsatisfactory in one or more ways.

This invention accordingly has as its general objective the preparation of new esters which can be substituted for the rapidly drying natural fatty oils in coating compositions into which fatty oils are ordinarily formulated.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acids which will give esters having such properties.

A still further objective is the preparation of esters from those monocarboxylic acids which have the particular type of unsaturation, and other elements of chemical structure, which will impart rapid drying film properties to said esters.

An additional objective is the provision of methods of making these new esters.

The above and other objects appearing hereinafter are accomplished by preparing, for example, by one of the methods subsequently described in detail, a polyhydric alcohol mixed ester of a monofunctional $\alpha,\beta$-ethylenic-$\beta$-aryl monocarboxylic acid, as defined below, and at least one other monofunctional monocarboxylic acid of different structure. The latter acids are preferably unsaturated, those derived from natural drying or semi-drying oils being most useful.

The expression "$\alpha,\beta$-ethylenic-$\beta$-aryl monocarboxylic acid" is used in a generic sense to mean any monocarboxylic acid having an ethylenic double bond between the $\alpha$ and $\beta$ carbon atoms and an aromatic ring directly attached to the $\beta$ carbon atom.

The novel properties of the products of the invention are considered to depend from this peculiar and particular sequence of aryl group, ethylenic double bond, and carboxyl group. The remainder of the molecule is substantially immaterial provided the acid is "monofunctional," i. e., contains no groups such as hydroxyl, primary amino, secondary amino, sulfhydryl, and the like, which are known to react with the carboxyl group under normal esterification conditions.

The mixed esters of this invention can be prepared in general by reacting a polyhydric alcohol, simultaneously or successively, in either order, with one or more of the above described monofunctional $\alpha,\beta$-ethylenic-$\beta$-aryl monocarboxylic acids, or their esterifiable derivatives, and with at least one monofunctional monocarboxylic acid of different structure, or appropriate esterifiable derivative.

More specifically, in one of the preferred methods of carrying out the invention, an $\alpha,\beta$-ethylenic-$\beta$-aryl monocarboxylic acid is reacted with a polyhydric alcohol which has been partially esterified with a different acid or acids. When these polyhydric alcohol partial esters are glycerol partial esters of a long chain fatty acid, they are most suitably obtained by heating fatty oils in the usual way with glycerol and, preferably, an ester-interchange catalyst. In carrying out this alcoholysis step, the oil and free polyhydric alcohol, in proportions calculated to give the degree of alcoholysis desired, are placed, along with a small amount of alcoholysis catalyst (e. g., 0.01 to 0.1% litharge based on the oil), in a reactor fitted with an agitator, a device to measure the temperature, and a gas inlet. The mixture is then heated with stirring for 1 to 2 hours at about 200–250° C., an oxygen-free inert gas such as carbon dioxide or nitrogen being passed into and over the mixture. In the esterification step, this polyhydric alcohol partial ester is usually cooled to about 140–150° C., and the $\alpha,\beta$-ethylenic-$\beta$-aryl monocarboxylic acid, or esterifiable derivative, is introduced in approximately the amount sufficient to esterify the free hydroxyl groups calculated to be present from the initial proportions of oil and polyhydric alcohol. A hydrocarbon solvent, such as xylene or toluene, is next added in an amount sufficient to produce boiling when the temperature reaches about 200° C. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. Depending on the temperature of reaction, which in turn is governed by the nature and amount of solvent employed, the reaction is usually completed within 4-16 hours; thus, when the temperature is around 200° C., the process is usually completed within 8-12 hours. The reaction can be accelerated if desired by means of esterification catalysts, such as sodium bisulfate. The progress of the reaction can be followed by acid number determinations, the heating being stopped when the acid number reaches or approaches constancy or at the desired value. There is obtained a viscous solution of the new drying oil from which the solvent can be removed, if desired, by distillation or by forcing a rapid stream of carbon dioxide through the mixture. This oil can be formulated, by conventional methods used with natural drying oils, into valuable coating compositions. For such purposes, it can be used alone, or in blends with natural or synthetic resins and/or natural drying or semi-drying oils. Hot blending of these new oils with the natural drying or semi-drying oils gives coating composition vehicles of unique properties.

Another good method of preparing the polyhydric alcohol mixed esters of this invention is to heat together a polyhydric alcohol, a polyhydric alcohol ester such as a drying or semi-drying oil, and sufficient $\alpha,\beta$-ethylenic-$\beta$-aryl monocarboxylic acid or acids to esterify the free hydroxyl groups present in this mixture.

In preparing the esters of the present invention, certain precautions are often necessary in order to obtain satisfactory results from a number of standpoints. The esterification reaction for the preparation of the drying oil is preferably carried out at as low a temperature as is practical. Another such precaution is the maintenance of an inert atmosphere by the use of an oxygen-free inert gas. By complete or essentially complete exclusion of oxygen, superior color is obtained, while, if the reaction is carried out at high temperature in the presence of oxygen, poorer color, combined with decomposition and sometimes inferior drying, is encountered. To obtain light-colored products, it is also necessary to avoid use of materials which liberate oxygen under reaction conditions. Thus, solvents employed should not be those which contain or give off free oxygen or similar active products during the reaction. For example, aged turpentine or old samples of petroleum naphtha should not be used since the peroxides usually present in these materials produce deleterious effects. Other oxygen-yielding compounds, for example, oxidized drying oils, should be excluded in order to insure good color, and to avoid degradation and gelation of the resulting compositions.

The more detailed practice of the invention is illustrated in the following examples wherein the amounts of the ingredients are by weight, such examples being given by way of illustration and not as a limitation. In these examples, viscosities and colors are given on the Gardner-Holdt scale, and the hydroxyl numbers are all corrected for acidity. Where the use of cobalt drier is mentioned, sufficient of a 2% cobalt naphthenate solution has been used to give the indicated content of cobalt metal, this proportion being based on oil.

The ester compositions in the titles of each example do not mean that the product actually contains the stated percentages of triglycerides, but are instead an index to the proportion of monocarboxylic acid radicals in the product. To illustrate, a product referred to as having 21.6% cinnamic acid glyceride and 78.4% linseed acids glyceride is a product prepared from proportions of reactants so chosen as to yield theoretically a mixture of these two glycerides in the stated proportions by weight, i. e., if it be assumed no mixed ester is formed. Actually, such a product is considered to be composed principally of mixed glycerides, probably mixtures of mixed glycerides, though small amounts of simple glycerides, partial glycerides (i. e., glycerol incompletely esterified), free glycerol, and free acids are probably present. The significance of the $\alpha,\beta$-ethylene-$\beta$-aryl monocarboxylic acid ester content is discussed following the examples.

EXAMPLE 1

*Glycerol mixed ester of linseed oil acids and cinnamic acid*

|  | Per cent |
|---|---|
| Cinnamic acid glyceride | 21.6 |
| Linseed acids glyceride | 78.4 |

A partial glycerol ester of linseed oil acids, commonly called linseed oil diglyceride, is first prepared by heating 1300 parts of alkali-refined linseed oil and 69.4 parts of refined glycerol for 1.5 hours at 250° C. in an inert atmosphere. To 250 parts of this diglyceride are added 70 parts of cinnamic acid and 20 parts of toluene. This mixture is refluxed for 7 hours at 215-220° C. in an apparatus equipped to allow the condensation of toluene and water of esterification, separation of the water, and return of toluene to the reaction vessel. An inert atmosphere of carbon dioxide is maintained throughout the esterification, and at the completion of the reaction a vigorous stream of carbon dioxide is blown through the reaction mixture at 200° C. for 20 minutes in order to remove the solvent and traces of unreacted acid. After cooling and filtering, the mixed glyceride is found to possess the following physical and analytical values: $N_D^{25}$ 1.4973; $d_4^{25}$ 0.9632; hydroxyl No. 25.1; iodine No. 145.2; saponification No. 211.0; acid No. 5.9; viscosity C; color 3.15.

Films of this oil containing 0.03% cobalt drier, over substrates such as steel or wood, are dust-free in 5 hours at room temperature, and after standing overnight are essentially tack-free. On baking, for example at 100° C., drying is much faster and, if desired, driers can be eliminated. Completely dried films are hard and tough, glossy and adherent, and, even without formulation with gums to yield varnishes, resemble films obtained from China-wood oil-limed rosin varnishes, or from perilla oil-"Amberol" varnishes of about 45-gallon oil length. Under these same conditions, unmodified linseed oil films are very sticky after drying 5 hours, have an appreciable tack after overnight dry, and eventually dry to soft, weak films having a residual tack.

The oil described above can be formulated into a resin-oil varnish in the following manner. One hundred (100) parts of the oil is bodied by heating in an inert carbon dioxide atmosphere at 295-300° C. for 45 minutes. Upon cooling, the oil is found to have a viscosity of Z-3. To 78 parts of this oil are added 35 parts of a limed rosin solution (64% limed rosin in mineral spirits), and enough manganese resinate and lead naphthenate to furnish 0.04% manganese and 4% lead, respectively, based on the oil. The product is diluted to viscosity E with mineral spirits. Films of this varnish, after drying, are tack-free and of a hardness similar to that of films from a perilla varnish of comparable oil length. Exposures of this varnish, over steel and representative undercoats, after 11 months in Delaware, show durability equal to the varnish controls mentioned in the preceding paragraph.

This oil can also be made into an enamel as follows: 20 parts of oil, 10 parts of titanium dioxide, 10 parts of antimony oxide, and about 5 parts of a hydrocarbon thinner are ground together in a pebble mill to give a dispersed system. Cobalt and lead driers in amounts of 0.03% and 0.3%, respectively, based on oil, are added. The dried films are hard and possess good covering power over wood.

EXAMPLE 2

Glycerol mixed ester of linseed oil acids and p-methoxycinnamic acid

|  | Percent |
| --- | --- |
| p-Methoxycinnamic acid glyceride | 22.2 |
| Linseed acids glyceride | 77.8 |

To 120 parts of the linseed oil diglyceride described in Example 1 are added 15 parts of toluene and 36 parts of p-methoxycinnamic acid, of the formula

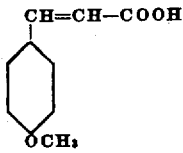

and melting at 170° C. (obtainable from p-methoxybenzaldehyde, sodium acetate and acetic anhydride according to general method of Perkin, Jour. Chem. Soc., 31, 408 (1877)). This mixture is refluxed for 18 hours at 200° C. in the same type of apparatus described in the previous example. A vigorous stream of carbon dioxide is next blown through the reaction mixture at 200° C. for 20 minutes in order to remove the solvent and unreacted acid. The resulting oil, after being cooled and filtered, is found to possess the following physical and analytical values: hydroxyl No. 15.7; acid No. 6.1; viscosity J; color 4.3. Thin films of this oil containing 0.03% cobalt drier are dust-free in about 4 hours and are hard and dry in 2 days at room temperature. Films of this oil are slightly superior in nearly all properties to the films of the oil described in Example 1. Exposures of this varnish over steel and undercoats, after 8 months in Delaware, show durability somewhat superior to the unmodified linseed oil or the varnish controls described in Example 1.

EXAMPLE 3

Glycerol mixed ester of linseed oil acids and 3,4-methylenedioxycinnamic acid

|  | Percent |
| --- | --- |
| 3,4-methylenedioxycinnamic acid glyceride | 24.8 |
| Linseed acids glyceride | 75.2 |

To 123.2 parts of linseed oil diglyceride, prepared as described in Example 1, are added 10 parts of toluene and 41 parts of 3,4-methylenedioxycinnamic acid, of the formula

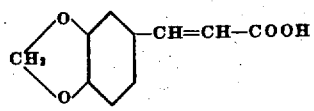

melting at 228° C., and having a neutral equivalent of 196 (prepared by condensing 3,4-methylenedioxybenzaldehyde with malonic acid, or as disclosed by Perkin in Jour. Chem. Soc., 59, 152 (1891)). During 10.5 hours at 200° C., under the conditions given in previous examples, this mixture undergoes esterification to yield a homogeneous oil which, after removal of solvent and unreacted acid, is found to possess the following physical and analytical values: $N_D^{25}$ 1.5075; hydroxyl No. 5.8; acid No. 4.0; viscosity G; color 9.

Films of this oil containing 0.03% cobalt drier are tack-free after 2–3 days at room temperature, and are comparable in their properties to the films described in Example 2.

EXAMPLE 4

Glycerol mixed ester of linseed oil acids and β-(α-naphthyl)acrylic acid

|  | Percent |
| --- | --- |
| β-(α-Naphthyl)acrylic acid glyceride | 26.4 |
| Linseed acids glyceride | 73.6 |

To 93 parts of linseed oil diglyceride, prepared as described in Example 1, except that 0.01% litharge is used as interchange catalyst, are added 30 parts of β-(α-naphthyl)acrylic acid (prepared from α-naphthaldehyde, methyl acetate, and sodium methoxide, followed by hydrolysis of the ester, or as disclosed by Brandis in Ber., 22, 2153 (1889); melting point 192–194° C; neutral equivalent 198), and 0.1% sodium bisulfate based on the diglyceride. This mixture is refluxed for 5.5 hours at 200–212° C. under the conditions given in previous examples. After removal of solvent and some of the unreacted acid, the resulting oil is found to possess the following physical and analytical values: $N_D^{25}$ 1.5178; hydroxyl No. 12.9; acid No. 2.4; viscosity F; color 4.5. Films of this oil containing 0.03% cobalt drier are dust-free after 3–4 hours at room temperature, and tack-free after drying overnight. Under these same conditions, unmodified linseed oil films are very sticky after drying 5 hours, have an appreciable tack after overnight dry, and eventually dry to softer, weaker films.

For each particular combination of polyhydric alcohol, α,β-ethylenic-β-aryl monocarboxylic acid, and other monocarboxylic acid, there is a range of α,β-ethylenic-β-aryl monocarboxylic acid-polyhydric alcohol simple ester content within which the products dry fastest and have best film properties generally. In regard to the glycerol mixed esters of monofunctional α,β-ethylenic-β-aryl monocarboxylic acids, and more particularly in regard to glycerol mixed esters of cinnamic acid and drying or semi-drying oil acids (especially linseed oil acids), it will usually be found that most valuable products have on the order of 10–30% α,β-ethylenic-β-aryl monocarboxylic acid glyceride. The proportions for best results will, however, vary somewhat with the particular ingredients.

After the film-forming properties of esters obtained from different proportions of a particular polyhydric alcohol, α,β-ethylenic-β-aryl monocarboxylic, and other monocarboxylic acid have been established by simple testing, it is possible to prepare, by appropriate selection of proportions, a polyhydric alcohol mixed ester having any desired degree of improvement in film-forming properties (up to the maximum possible for the ingredients involved) as compared to the polyhydric alcohol simple ester of the acid other than the α,β-ethylenic-β-aryl monocarboxylic acid. More specifically, when the polyhydric alcohol is glycerol and the other acid is drying or semi-drying oil acids, it is possible, by appropriate selection of proportions, to prepare a mixed glyceride having the desired degree of improvement (up to the maximum possible for the ingredients involved) as compared to the drying or semi-drying oil whose acids are being used.

The desired proportion of $\alpha,\beta$-ethylenic-$\beta$-aryl monocarboxylic acid glyceride is normally obtained by using the calculated amount of an $\alpha,\beta$-ethylenic-$\beta$-aryl monocarboxylic acid or esterifiable derivative. However, an effect which approaches or equals the behavior of the mixed ester so made can be obtained by preparing a mixed ester of $\alpha,\beta$-ethylenic-$\beta$-aryl monocarboxylic acid glyceride content higher than that desired, and blending it with the drying oil whose acids are being used (or a different oil if desired) in an amount which is calculated to give a mixed ester of the desired $\alpha,\beta$-ethylenic-$\beta$-aryl monocarboxylic acid glyceride content. Where the $\alpha,\beta$-ethylenic-$\beta$-aryl monocarboxylic acid glyceride content is high (i. e., above 25%), the blending is preferably carried out at elevated temperatures; suitable conditions are, for example, the heating of the two oils, with stirring and in an inert gas atmosphere, for about 0.5 hour at about 200° C. Under these conditions, it is probable that some interchange occurs, since the film-forming properties are usually better than those of cold-blends of the two oils.

As has already been stated, the esters of the present invention can be made by reacting the polyhydric alcohol, simultaneously or successively, in any order, with the $\alpha,\beta$-ethylenic-$\beta$-aryl monocarboxylic acid or acids and other monocarboxylic acid or acids. Or a polyhydric alcohol simple ester of either the $\alpha,\beta$-ethylenic-$\beta$-aryl monocarboxylic acid or the other acid can be reacted successively with additional polyhydric alcohol and the remaining acid. In the first, i. e., alcoholysis, step of this latter process, an ester-interchange catalyst, such as litharge, sodium hydroxide, sodium alcoholate, etc., is preferably included in small amount, suitably from 0.01% to 1.0%. The reaction temperature for the alcoholysis can be varied from 150 to 300° C., depending on the extent of alcoholysis desired, the nature and amount of catalyst, if any, and the susceptibility of the ester to gelling.

Also, as has been stated, esterifiable derivatives of both the $\alpha,\beta$-ethylenic-$\beta$-aryl monocarboxylic acids and the different acids can be used in the above processes in place of the free acid. Suitable derivatives are the anhydride, an acid halide, or an ester with an alcohol more volatile than the polyhydric alcohol whose ester is to be prepared.

The reaction temperature can be varied widely, but will in general be governed by the reactants used; thus, with an acid halide or anhydride, temperatures in the neighborhood of 20–100° C. are usually sufficient to produce esterification, while the direct esterifications with acids and the ester-interchange processes are preferably operated at temperatures above 100° C. and below 275° C.

Solvents and other preparative details should be adjusted to the method chosen, the manner of so doing being apparent to one skilled in the art. When the solution method heretofore discussed is to be used, any inert water-immiscible liquid which dissolves the product is suitable, hydrocarbons being preferable, and the amount can be varied as desired. Suitable specific solvents include toluene, xylene, cymene, amylbenzene, tetrachloroethane, anisol, and cyclohexanone. Aromatic hydrocarbons, chlorinated solvents, ethers, and ketones are suitable in general. A boiling point in the range 100–200° C. is desirable. The process of the invention can also be carried out in the absence of a solvent.

In addition to glycerol, other polyhydric alcohols can be used in the present invention, such as ethylene glycol, diethylene glycol, triethylene glycol, hexamethylene glycol, tetramethylene glycol, erythritol, pentaerythritol, sorbitol, mannitol, cyclohexyl-1,2-dicarbinol, methyltrimethylolmethane, and p,p'-di(2-hydroxyethyl)benzene.

The monofunctional monocarboxylic acid or acids other than the $\alpha,\beta$-ethylenic-$\beta$-aryl monocarboxylic acid can be any monofunctional monocarboxylic acid, or any mixture of such acids. Specific additional acids that are suitable include perilla oil acids, oiticica oil acids, China wood oil acids, soya bean oil acids, corn oil acids, cottonseed oil acids, coconut oil acids, oleic acid, stearic acid, lauric acid, p-toluic acid, butyric acid, crotonic acid, benzoic acid, furoic acid, sorbic acid, quinolinic acid, $\alpha$-naphthonic acid, phenoxyacetic acid, and the like. These acids may be aromatic or aliphatic; open or closed chain and, if the latter, mono-cyclic, polycyclic, homocyclic, or heterocyclic; saturated or unsaturated; straight or branched chain; and substituted or not by other groups or atoms, such as ether, ketone, halogen, etc., which do not interfere with the esterification reaction.

Any monofunctional $\alpha,\beta$-ethylenic-$\beta$-aryl monocarboxylic acid, as the term is hereinbefore explained, can be employed. The acid may or may not contain—on the aliphatic chain or the aryl group, or both—substituent radicals of any kind which do not interfere with the esterification reaction. Such radicals may be aliphatic or aromatic; open or closed chain, and, if the latter, homocyclic or heterocyclic; saturated or unsaturated; and substituted or not by such inert groups as ether, ketone, halogen, or sulfides. The following specific $\alpha,\beta$-ethylenic-$\beta$-aryl monocarboxylic acids, in general obtainable by reacting an aromatic aldehyde with an aliphatic acid anhydride according to the well-known method of Perkin, can be used instead of the acids of the examples with similar results: o-bromocinnamic acid, $\beta$-methylcinnamic acid, $\alpha$-methylcinnamic acid, 3,4-dimethoxycinnamic acid, and $\beta$-phenylcinnamic acid.

In addition to the particular coating compositions of the examples, the present esters can be formulated into any other desired type of paint, varnish, lacquer, or enamel. Thus, they can be blended by conventional methods with other varnish gums, such as copal, kauri, ester gum, oil-soluble phenol-formaldehyde resins, and rosin-extended phenol-formaldehyde resins, such as "Amberols"; with other resins, such as vinyl or urea-formaldehyde types; with cellulose derivatives, such as nitrocellulose, cellulose acetate, cellulose aceto-propionate, and ethyl cellulose; with auxiliary components of all kinds, such as waxes, solvents, pigments, and plasticizers, as needed and desired; and to particular advantage with fatty oils, especially drying or semi-drying oils, as is explained above.

These compositions can be applied to many kinds of surfaces and materials, for example, wood, metal, paper, linen, silk, cotton, other textiles, and regenerated cellulose wrapping foils. Specific manufactures that can be so produced are linoleum, patent leather, linoxyn-type materials, coated copper wire, oiled cloth, oiled silk, printing inks, and sandpaper. The products of the invention can also be made up into molding compositions, putties, and the like. In addition, they can be employed as modifying agents for urea-formaldehyde and phenol-formaldehyde resins.

It will be apparent from the foregoing description that new mixed esters having remarkable properties and a wide utility have been obtained. In particular, these esters are valuable substitutes for the natural drying oils in coating compositions, thereby reducing materially the dependence upon these natural products. The new esters have also many advantageous properties not shared by the natural oils, as, for example, the remarkable ability to form films which do not crystallize, wrinkle, or frost, as do films from the more rapidly drying natural oils, such as China wood oil. Furthermore, it is possible to take any fatty oil, including one that has a low order of drying, and, by substituting a part of the fatty acid making up that oil by an $\alpha,\beta$-ethylenic-$\beta$-aryl monocarboxylic acid, to improve the drying and film properties greatly. The compositions of the present invention are particularly outstanding in that they combine the high film build of the natural drying oils (resulting from the much higher solids content at working viscosities) with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:

1. A polyhydric alcohol mixed ester of a monofunctional $\alpha,\beta$-ethylenic-$\beta$-aryl monocarboxylic acid and another monofunctional monocarboxylic acid.
2. A glycerol mixed ester of a monofunctional $\alpha,\beta$-ethylenic-$\beta$-aryl monocarboxylic acid and another monofunctional monocarboxylic acid.
3. A glycerol mixed ester of a monofunctional $\alpha,\beta$-ethylenic-$\beta$-aryl monocarboxylic acid and the acids of a natural fatty oil.
4. A glycerol mixed ester of a monofunctional $\alpha,\beta$-ethylenic-$\beta$-aryl monocarboxylic acid and the acids of a natural drying oil.
5. A glycerol mixed ester of a monofunctional $\alpha,\beta$-ethylenic-$\beta$-aryl monocarboxylic acid and linseed oil acids.

JOHN C. SAUER.

---

CERTIFICATE OF CORRECTION.

Patent No. 2,381,887.  August 14, 1945.

JOHN C. SAUER.

It is hereby certified that error appears in the printed specification of the above numbered patent requiring correction as follows: Page 3, second column, line 62-63, for "monocarboxylic" read --monocarboxylic acid--; and that the said Letters Patent should be read with this correction therein that the same may conform to the record of the case in the Patent Office.

Signed and sealed this 27th day of November, A. D. 1945.

Leslie Frazer (Seal)  First Assistant Commissioner of Patents.

printing inks, and sandpaper. The products of the invention can also be made up into molding compositions, putties, and the like. In addition, they can be employed as modifying agents for urea-formaldehyde and phenol-formaldehyde resins.

It will be apparent from the foregoing description that new mixed esters having remarkable properties and a wide utility have been obtained. In particular, these esters are valuable substitutes for the natural drying oils in coating compositions, thereby reducing materially the dependence upon these natural products. The new esters have also many advantageous properties not shared by the natural oils, as, for example, the remarkable ability to form films which do not crystallize, wrinkle, or frost, as do films from the more rapidly drying natural oils, such as China wood oil. Furthermore, it is possible to take any fatty oil, including one that has a low order of drying, and, by substituting a part of the fatty acid making up that oil by an $\alpha,\beta$-ethylenic-$\beta$-aryl monocarboxylic acid, to improve the drying and film properties greatly. The compositions of the present invention are particularly outstanding in that they combine the high film build of the natural drying oils (resulting from the much higher solids content at working viscosities) with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:
1. A polyhydric alcohol mixed ester of a monofunctional $\alpha,\beta$-ethylenic-$\beta$-aryl monocarboxylic acid and another monofunctional monocarboxylic acid.
2. A glycerol mixed ester of a monofunctional $\alpha,\beta$-ethylenic-$\beta$-aryl monocarboxylic acid and another monofunctional monocarboxylic acid.
3. A glycerol mixed ester of a monofunctional $\alpha,\beta$-ethylenic-$\beta$-aryl monocarboxylic acid and the acids of a natural fatty oil.
4. A glycerol mixed ester of a monofunctional $\alpha,\beta$-ethylenic-$\beta$-aryl monocarboxylic acid and the acids of a natural drying oil.
5. A glycerol mixed ester of a monofunctional $\alpha,\beta$-ethylenic-$\beta$-aryl monocarboxylic acid and linseed oil acids.

JOHN C. SAUER.

CERTIFICATE OF CORRECTION.

Patent No. 2,381,887. August 14, 1945.

JOHN C. SAUER.

It is hereby certified that error appears in the printed specification of the above numbered patent requiring correction as follows: Page 3, second column, line 62-63, for "monocarboxylic" read --monocarboxylic acid--; and that the said Letters Patent should be read with this correction therein that the same may conform to the record of the case in the Patent Office.

Signed and sealed this 27th day of November, A. D. 1945.

Leslie Frazer (Seal) First Assistant Commissioner of Patents.